2,717,798

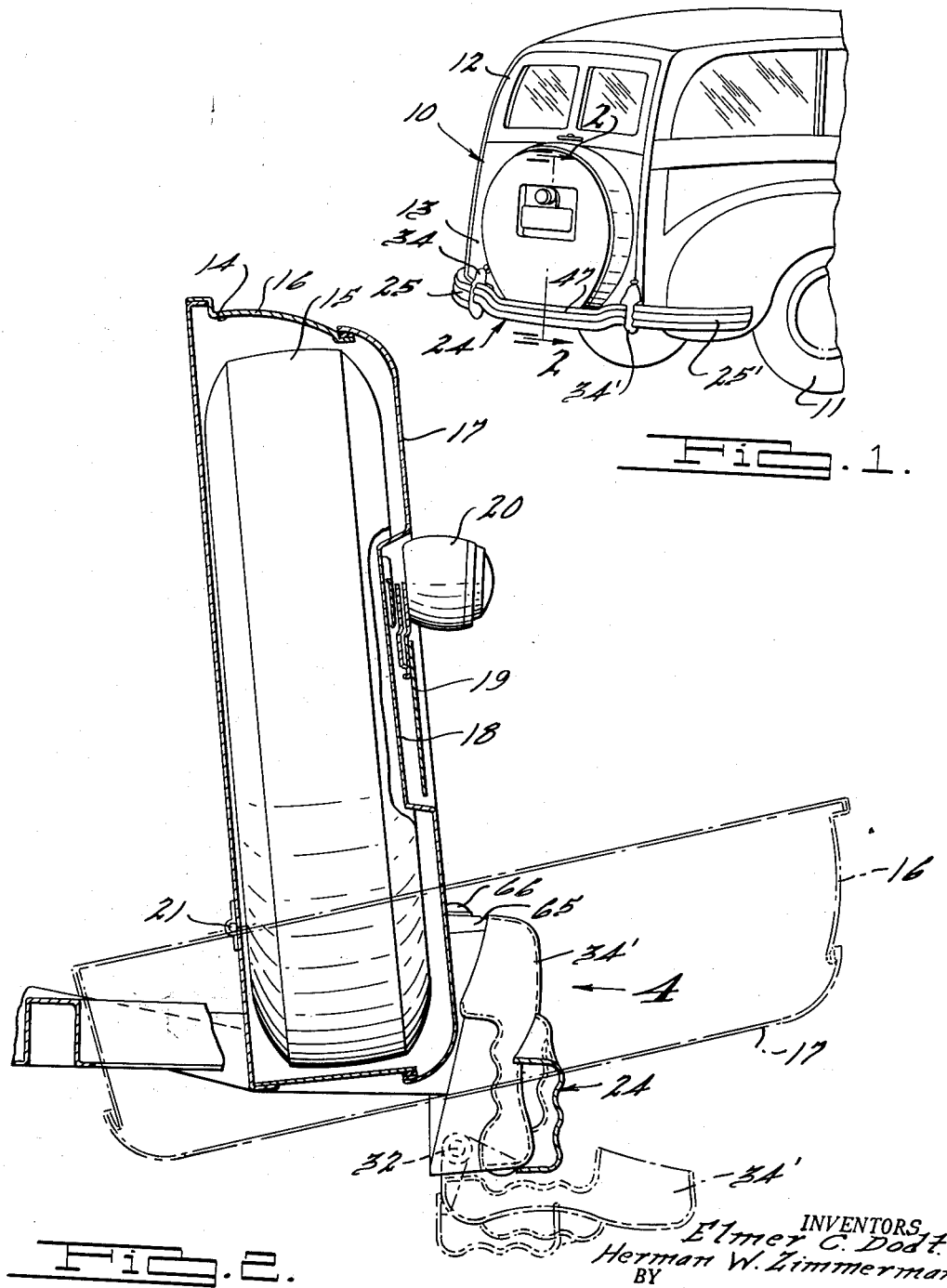

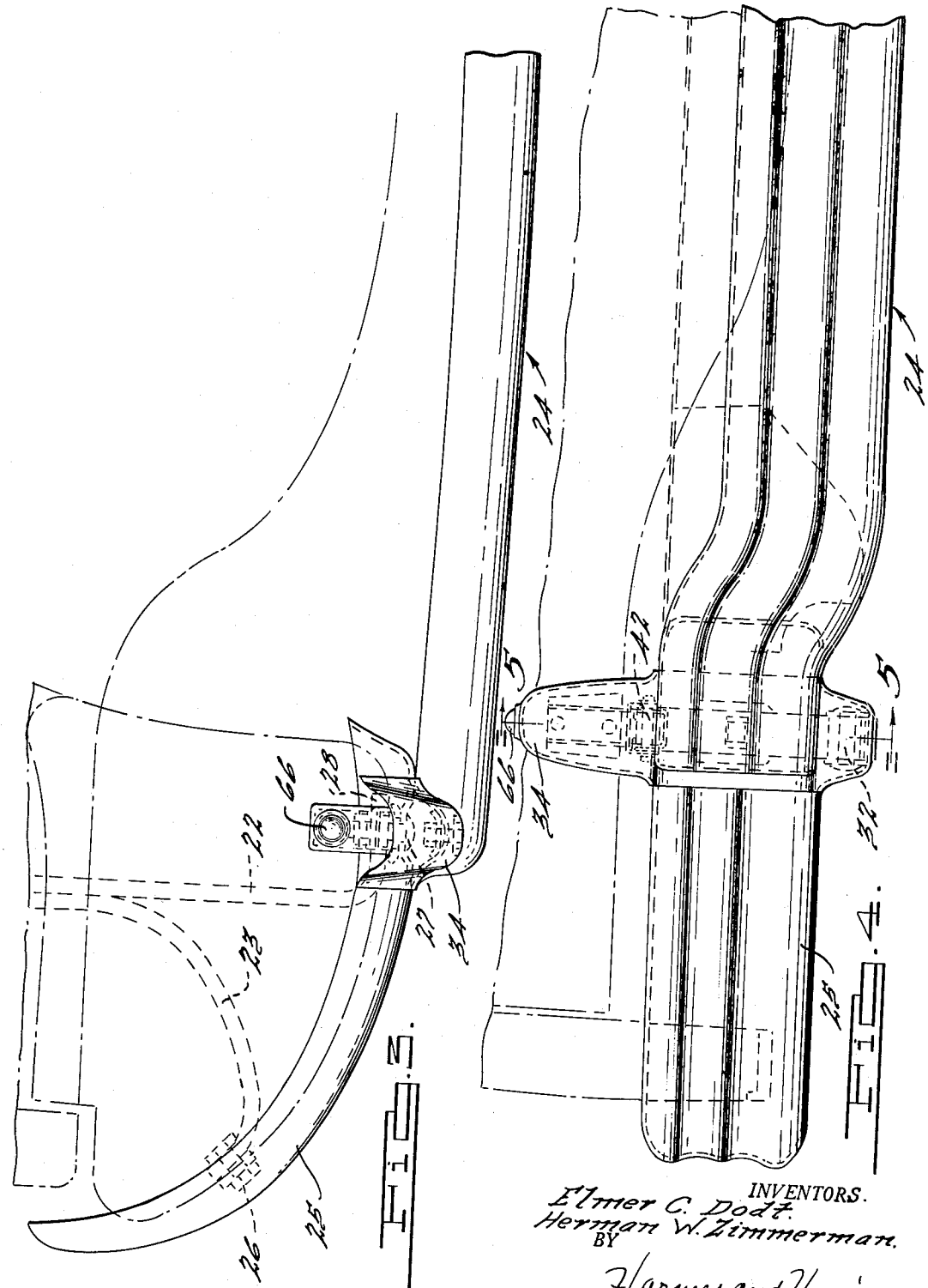

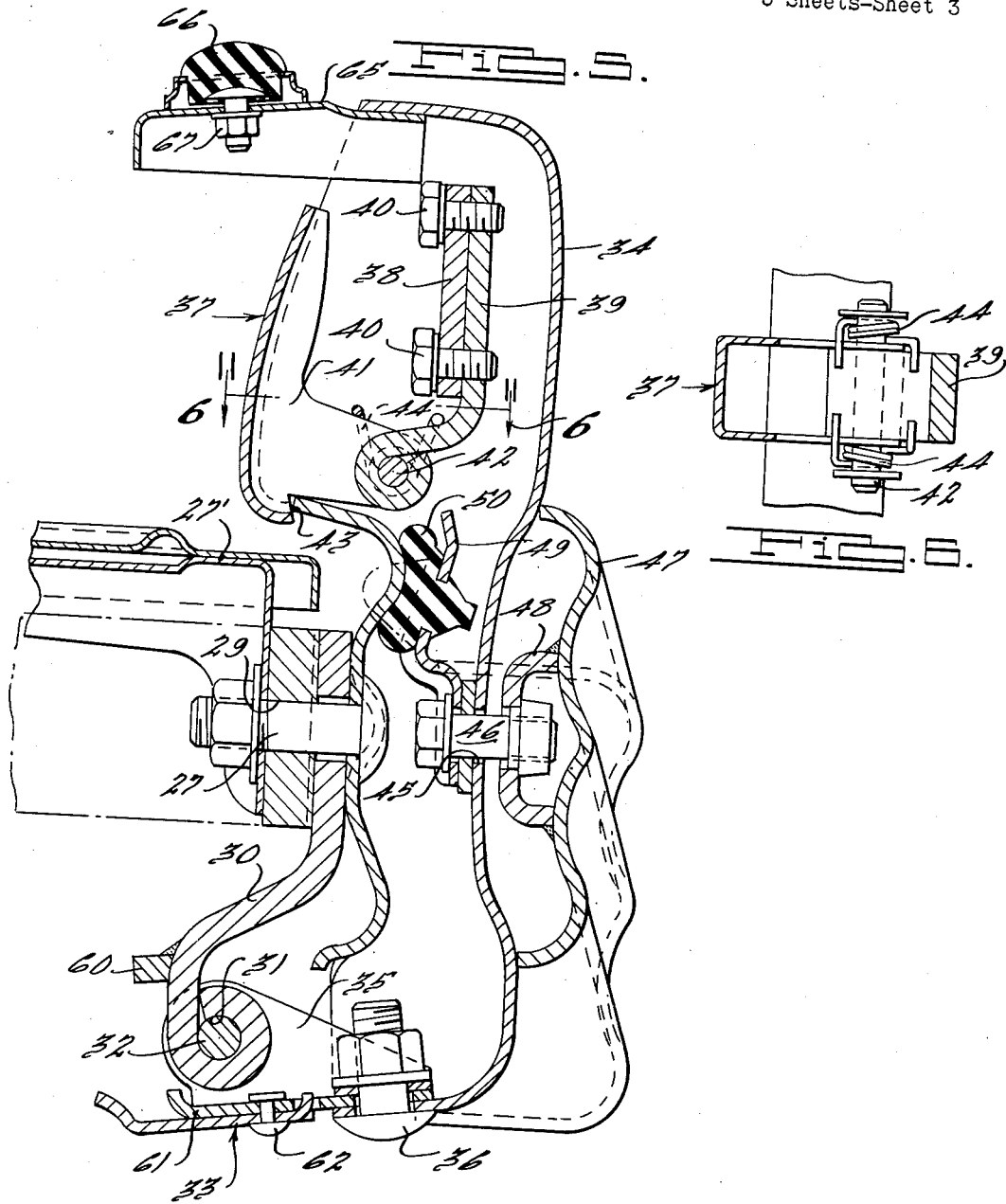

BUMPER STRUCTURE

Elmer C. Dodt, Huntington Woods, and Herman W. Zimmerman, Detroit, Mich., assignors to Chrysler Corporation, Highland Park, Mich., a corporation of Delaware Application May 5, 1950, Serial No. 160,190

1 Claim. (Cl. 293—66)

Our invention relates to vehicle body structure and more particularly to an improved bumper and bumper guard assembly.

In the past it has been difficult to design the rear door of a vehicle which may be readily opened and closed due to the presence of the rear bumper and bumper guards. This problem has been especially pronounced in the case of the vehicles commonly known as "station wagons" where the spare tires of the vehicles are mounted on the rear doors thereof. It is a principal object of the present invention to provide a vehicle with an improved bumper and bumper guard assembly which permits the free movement of the vehicle rear door.

A further object of our invention is to provide an improved bumper and bumper guard assembly having a portion thereof rotated about a pivot point and substantially separated from the remainder of the assembly.

Another object of our invention is to provide an improved vehicle bumper and bumper guard assembly with a rotatable center section which may be rotated to a lowered position or firmly fixed in an upright position during normal operation of the vehicle.

Still another object of our invention is to provide an improved bumper and bumper guard assembly with means for indicating to the operator of the vehicle that the swinging section of the bumper assembly has not been moved when the operator opens the rear door of the vehicle.

Other objects and advantages will become more apparent from the following description of one embodiment of our invention, reference being had to the accompanying drawings in which:

Fig. 1 is a perspective view of the rear portion of a vehicle commonly known as a "station wagon" illustrating broadly the application of our invention thereto.

Fig. 2 is a sectional view of the rear end of the vehicle taken on the line 2—2 of Fig. 1.

Fig. 3 is a fragmentary plan view of approximately one half of the vehicle bumper and bumper guard assembly and its associated structure.

Fig. 4 is an end view of the structure shown in Fig. 3.

Fig. 5 is a sectional view of the vehicle bumper guard assembly taken on the line 5—5 of Fig. 4.

Fig. 6 is a sectional view of the latch means of the bumper guard member taken on the line 6—6 of Fig. 5.

In the drawings we have shown a vehicle of the type commonly referred to as a station wagon which includes a body structure, generally designated by the numeral 10 supported by wheels 11. The body structure 10 includes two rear upper and lower swinging doors 12 and 13, respectively, the former being adapted to swing upwardly, and the latter being adapted to swing downwardly. Referring now more particularly to Fig. 2, the lower swinging door 13 is provided with a spare tire compartment 14 which protrudes outwardly from the lower door and which houses a spare tire 15 therein. The compartment 14 is provided with a substantially cylindrical side wall 16 as a circular cover 17 which is pivotally mounted at a location on the inner surface of the wall portion 16 (not shown). The cover 17 is provided with a centrally located recess 18 which receives a vehicle license plate 19 and tail light 20. The lower door 13 is pivoted for swinging movement at 21, the dashed lines in Fig. 2 illustrating the lower position of the door 13. The door 13 is mounted on the frame structure of the vehicle which is not shown for the purposes of simplicity. Referring now more particularly to Fig. 3, the frame structure of the vehicle is provided with rearwardly extending brackets 22 and 23 for supporting a rear bumper assembly, generally designated by the numeral 24. The brackets 22 and 23 each have one end suitably secured to the frame structure while the other ends thereof diverge relative to each other and are secured to the bumper assembly by means hereinafter described.

The entire rear bumper assembly of the vehicle may, for the purpose of description be divided into two complementary halves. For the purpose of simplicity, the following description will be limited to one of the halves only, it being understood that the two complementary halves are actually integrally connected.

The bumper assembly 24 comprises a pair of similar curved side portions 25 and 25' which are both shown only in Fig. 1. As more clearly shown in Fig. 3, the typical side bumper member 25 is secured to the diverging free end of the bracket 23 by a nut and bolt assembly 26 and is also secured to the diverging end of the bracket 22 by a nut and bolt assembly 27. The bracket 22 is provided at the aforementioned diverging free end with a bent end portion 28 which has an opening 29 for receiving the bolt of the nut and bolt assembly 27. This nut and bolt assembly clampingly supports a conventional shield 27' which is disposed between the bumper structure and the body of the vehicle. The nut and bolt assembly 27 not only secures the side bumper portion 25 to the bracket 22 but also secures a depending bracket 30 between the end portion 28 and the side bumper member 25. The depending bracket 30 extends downwardly from the nut and bolt assembly 27 and then forwardly of the vehicle and has its depending end constructed to form a passage 31 for receiving a pin 32 therethrough. The pin 32 pivotally secures a bumper guard assembly, generally designated by the numeral 33, to the bracket 30. The bumper guard assembly 33 comprises generally vertical bumper guard members 34 and 34' which are disposed for pivotal movement relative to the frame structure. The guard members 34 and 34' are disposed adjacent the adjacent ends of the side members 25 and 25', respectively, and for reasons heretofore set forth, the description will be limited to the typical guard 34 and its associated structure. The guard 34, at its lower end, is secured to a pivot member 35 by a nut and bolt assembly 36, the pivot member 35 forming the moving pivotal member of the pivot connection about the pin 32.

The bumper guard assembly 33 is provided with a latch mechanism, generally designated by the numeral 37, for engaging the upper lateral edge of the side bumper member 25 and maintaining the bumper guard assembly in a vertical position. The bumper guard member 34 is substantially hollow having an open side thereof facing the rear end of the vehicle and is provided with a support member 38 which is secured between the side walls of the bumper guard member 34 and which is secured to a depending bracket 39 by bolts 40. The lower end of the bracket 39 extends inwardly of the bumper guard assembly and is pivotally connected to a latch member 41 by a pin 42. The latch member 41 is substantially L-shaped having the extremity of horizontal leg thereof pivotally connected at the pin 42 and having the other leg extending partially outwardly of the bumper guard member 34. The latch member 41 is provided with a shoulder 43 at substantially the juncture of the legs of the L which engages the upper lateral edge of the side bumper member 25 when the bumper guard assembly is in its vertical position. The latch member 41 is urged counter-clockwise about the pin 42, as viewed in the drawings, by springs 44 which have their coil portions wrapped around the pin 42 and their end portions engaging the horizontal leg of the latch member and the bracket 39. These springs also urge the shoulder 43 against the upper lateral edge of the side member 25. It may be readily seen that the outwardly extending portion of the vertical leg of the latch member 41 may be manually energized and moved inwardly of the bumper guard member 34 to thereby disengage the shoulder 43 from the aforementioned lateral edge of the side bumper member 25. In this manner the bumper member may be free from the side bumper member and thereafter be allowed to pivot downwardly and away from the side bumper about the pin 32.

The vertical bumper guard member 34 is provided with an opening 45 which receives the bolt of a nut and bolt assembly 46, the latter securing one end of a central bumper member 47 to the bumper guard member 34. The other end of the central member 47 is secured to the bumper guard member 34' so that the member 47 moves with the guard members when they are pivoted relative to the frame structure of the vehicle. For reasons heretofore set forth, only the connection of the central member 47 to the guard member 34 is described, it being understood that its connection to the guard member 34' is identical. The central member 47 is provided with a bolt receiving bracket 48 which extends inwardly from its inner surface and retains the bolt of the nut and bolt assembly 48 so that the head of the bolt will not be visible from the rear of the vehicle. The nut and bolt assembly 46 also secures a bracket 49 to the bumper guard member 34, this bracket extending upwardly from the nut and bolt assembly and carrying a rubber-like cushion member 50 thereon. The cushion member extends inwardly towards the side bumper member 25 and is adapted to engage the upper portion thereof in a cushioning manner when the bumper guard assembly is in its vertical position. The dashed lines shown in Fig. 5 indicate the uncompressed configuration of the cushion member 50.

The depending bracket 30 is provided with a stop member 60 integrally connected thereto adjacent its lower end which is adapted to engage a finger 61 secured to the pivot member 35 by rivet 62 when the bumper guard member 34 is in its lowered position as indicated by the broken lines in Fig. 2. The pivot member 35 is provided with a spring-like finger 63 which is also secured by the rivet 62 and which has its free end bent upward to clampingly engage the stop member 60. By this construction, the bumper guard assembly is held in place when it is in its lowered position.

The upper portion of the bumper guard members 34 and 34' are each provided with an outwardly extending bracket 65 which carries a yieldable pad 66 secured thereto by a nut and bolt assembly 67. The pad 66 is adapted to engage the outer surface of the lower door 13 if the operator of the vehicle attempts to lower the door without first swinging the bumper guard assembly which includes the bumper guard members 34 and 34' and the central bumper member 47, downwardly. By this construction the finish on the door 13 is not marred by the bumper guard members if the operator of the vehicle acts inadvertently.

In accordance with our invention, therefore, we have provided a vehicle rear bumper and bumper guard assembly wherein the entire center portion may be pivoted downwardly and away from the permanently fixed portions of the assembly to facilitate unobstructed operation of the rear door of the vehicle. In the broader aspects of our invention, the structure herein disclosed may be utilized to allow other structure on the vehicle to be operated properly. In this respect our improved structure may be employed where, for example, the vehicle spare tire is stored beneath the vehicle luggage compartment in such position that it would be necessary to remove a portion of the bumper assembly to remove the tire.

While we have illustrated and described but one embodiment of our invention, it is to be understood that such is for the purpose of illustration only, and it is contemplated that those skilled in the art may modify certain details without departing from the spirit or scope of the invention as defined in the claim appended hereto.

We claim:

In a vehicle including a body structure, a bumper assembly mounted on said body structure including independent stationary sections and a shiftable section; said stationary sections each including supporting brackets fixed to said body structure and extending away therefrom longitudinally of the vehicle, and spaced bumper members mounted on said brackets one on each side of said vehicle, said spaced bumper members having inner and outer faces, and having their adjacent end portions terminating in spaced relation; said shiftable section comprising a center bumper member having outer and inner faces, the latter being in overlapping relation to the outer face of said spaced bumper members of said stationary sections; spaced bumper guard members securely mounted to and supporting said center member, said guard members being positioned intermediate said overlapping faces of said bumper members and in abutment thereto, and a hinge structure in part mounted on said supporting brackets and in part secured to and carrying said bumper guards for facilitating swinging movement of said center member of said shiftable section by means of said guards relative to said stationary sections, said center member being generally horizontally aligned with said spaced bumper sections to provide a continuous bumper structure across the vehicle and latch means secured to said guard members and engageable with said bumper members of said stationary sections fo releasably holding said shiftable section in a vertical position relative to said stationary sections.

References Cited in the file of this patent

UNITED STATES PATENTS

| 1,562,694 | Farum | Nov. 24, 1925 |
| 1,572,603 | Heide | Feb. 9, 1926 |
| 2,273,131 | Monckmeier | Feb. 17, 1942 |